United States Patent [19]

Parizet

[11] Patent Number: 4,495,827

[45] Date of Patent: Jan. 29, 1985

[54] GEAR DRIVE DEVICE AND THE APPLICATION THEREOF IN A WINDOW WINDER OF AN AUTOMOBILE VEHICLE

[75] Inventor: Roger Parizet, Bonnee, France

[73] Assignee: Compagnie Industrielle De Mecanismes en abrege C.I.M., France

[21] Appl. No.: 409,741

[22] Filed: Aug. 19, 1982

[30] Foreign Application Priority Data

Aug. 31, 1981 [FR] France .................. 81 16555

[51] Int. Cl.³ ............... F16H 27/02; F16H 29/02; F16H 29/20; E05F 11/44
[52] U.S. Cl. ............................... 74/89.18; 74/422; 74/448; 49/350; 49/348
[58] Field of Search ............ 49/348, 349, 350; 74/89.18, 89.17, 89.16, 98, 422, 448

[56] References Cited

U.S. PATENT DOCUMENTS

| 1,655,695 | 1/1928 | Heintz et al. | 49/350 |
| 1,800,001 | 4/1931 | Ackerman | 49/350 |
| 2,070,941 | 2/1937 | Dust | 49/350 |
| 2,162,109 | 6/1939 | Nicholson | 74/89.18 |
| 2,782,648 | 2/1957 | McLellan | 74/89.18 |
| 2,817,512 | 12/1957 | Christen | 49/349 |
| 2,983,479 | 5/1961 | Thomas | 74/89.18 |
| 3,706,236 | 12/1972 | Pickles | 49/349 |
| 3,925,932 | 12/1975 | Ladd et al. | 49/350 |
| 3,965,618 | 6/1976 | Pickles | 49/349 |
| 4,118,893 | 10/1978 | Becker | 49/348 |

FOREIGN PATENT DOCUMENTS

| 1060093 | 3/1954 | France | 49/350 |
| 506558 | 5/1939 | United Kingdom | 49/350 |

*Primary Examiner*—Lawrence J. Staab
*Assistant Examiner*—Michael David Bednarek

[57] ABSTRACT

In this window winder, at the end of the travel, the active face (7) of the abutment (6) of the driven toothed sector (4) is substantially perpendicular to the direction of the force ($F_1$) of the meshed teeth. This produces in the engaged part of the toothed sector a radial force ($R_2$) which urges it against the drive pinion (10). This avoids a deformation of the toothed sector in the event of an excessive force being exerted on this pinion.

7 Claims, 2 Drawing Figures

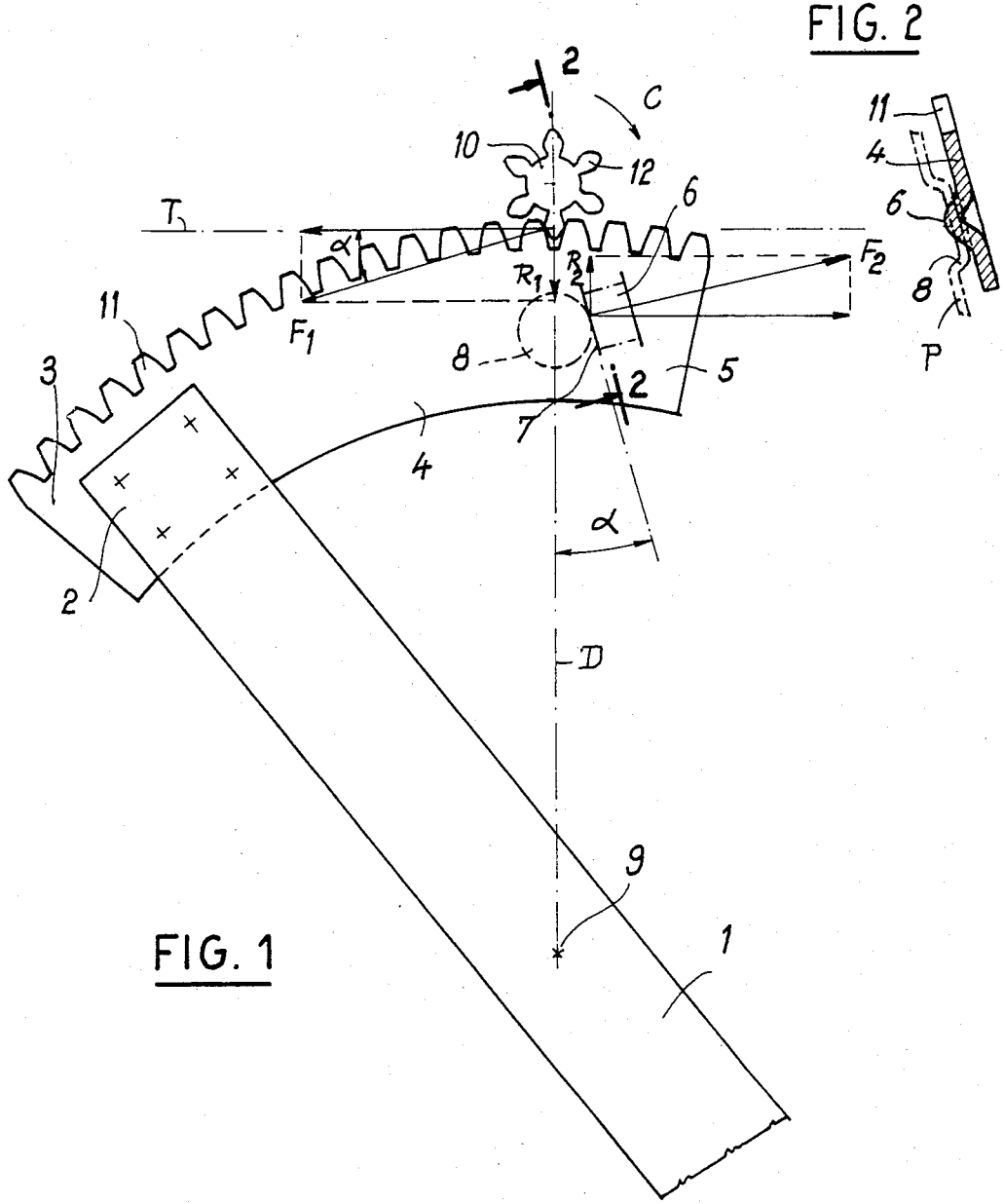

GEAR DRIVE DEVICE AND THE APPLICATION THEREOF IN A WINDOW WINDER OF AN AUTOMOBILE VEHICLE

DESCRIPTION

The present invention relates to a gear drive device of the type comprising a drive pinion and a driven toothed element provided with an end-of-travel abutment adapted to abut against a stop element, the teeth of the pinion and of the toothed element meshing at a positive pressure angle relative to the tangent to the pitch circle of the pinion.

The invention is in particular applicable to the actuation of manually controlled movable means of automobile vehicles such as a window winder, a sliding roof or a seat slide.

In these various cases, the user frequently exerts at the end of the travel a considerably excessive torque on the drive pinion which may be of the order of ten times the normal driving torque.

Now, in the known arrangements, the active face of the abutment is perpendicular to the pitch curve of the teeth of the driven element so that the stop element exerts on this abutment a force parallel to the tangent to this pitch curve at the meshing point, while the meshing force is inclined relative to this tangent in the direction away from the pinion.

Consequently, in the event of excessive torque at the end of the travel, the force exerted by the pinion on the toothed element has a radial component which is not compensated for and this tends to urge back this element and consequently there is a risk that the latter be deformed and damaged.

An object of the invention is to provide an arrangement which eliminates this risk and consequently permits the use of a less rigid, cheaper and lighter construction of the toothed element.

The invention therefore provides a drive device of the aforementioned type, wherein means are provided for pressing the toothed element and the pinion together when the abutment cooperates with the stop element.

In a particularly simple embodiment, when the active face of the abutment cooperates with the stop element, this face is inclined relative to the direction perpendicular to said tangent in the same direction as the teeth flanks in driving engagement.

Another object of the invention is to provide a window winder having a toothed sector, in particular for an automobile vehicle, comprising a drive device such as that defined hereinbefore, the toothed sector constituting said toothed element.

The invention will be described in more detail with reference to the accompanying drawing which shows only one embodiment. In the drawing:

FIG. 1 is a diagrammatic view of a drive device according to the invention;

FIG. 2 is a partial sectional view taken on line 2—2 of FIG. 1.

The drive device illustrated in the drawing is applied to the actuation of an automobile vehicle window winder in which the base of the window glass (not shown) is shifted by means of an arm 1 whose end 2 is fixed, eg. spot welded, to the end 3 of a toothed sector 4. The latter has the shape of a sector of a ring whose radial width is relatively small and whose outer peripheral portion is toothed.

The other end 5 of the sector 4 is provided with a projecting end-of-travel abutment 6 which cooperates by an active face 7 with a fixed stop pin 8 of cylindrical shape. The arm 1 pivots at an intermediate point about a fixed pivot pin 9.

The toothed sector 4 is driven by a drive pinion 10 whose shaft defines with the pin 9 a straight line D, this shaft and pin 9 being perpendicular to the plane of the arm 1 and sector 4 and being carried by a fixed support plate P (FIG. 2). This plate P also carries, in confronting relation to the sector 4, the cylindrical pin 8 whose active lateral surface is in the vicinity of the straight line D.

The exterior active portions of the teeth 11 of the sector 4 and the teeth 12 of the pinion 10 have convergent flanks so that the driving force $F_1$ of the meshed teeth, which is perpendicular to the drivingly-engaged flanks of the considered teeth 11 and 12, is not parallel to the tangent T to the pitch curve of the teeth 11 and 12 at the point of meshed engagement but inclined relative to this tangent at an angle $\alpha$, termed pressure angle, in the direction away from the pinion 10.

Consequently, the force $F_1$ of the meshed teeth has a radial component $R_1$ extending toward the pivot pin 9 of the arm 1 and proportional to the force $F_1$.

The abutment 6 is formed by shearing on two large sides and the press-forming of a rectangular tongue portion of the sector 4. These two sides, one of which defines the active face 7, are perpendicular to the force $F_1$ when this face abuts against the pin 8. Thus, the abutment force $F_2$ exerted by the pin 8 on the abutment 6 is parallel and substantially opposed in amplitude to the driving force $F_1$, and it has a radial component $R_2$ which is almost directly opposed to the component $R_1$.

In this way, whatever be the driving torque C exerted on the pinion 10 at the end of the travel, the component $R_1$ is always substantially balanced by the abutment component $R_2$ and the end 5 of the sector 4 has no tendency to be urged toward the pin 9 by the pinion. This toothed sector therefore undergoes no deformation or damage, particularly where it is fixed on the arm 1.

If the opposite end 3 of the sector 4 is also provided with an abutment, this can be arranged in the same way, ie. with an inclination of its active face relative to the straight line D, in the end-of-travel position, opposed to that of the face 7 of the abutment 6, ie. at a pressure angle of $\alpha$. However, it will be understood that the much greater radial rigidity of the end 3 of the toothed sector renders this inclination less necessary.

More generally any inclination in the suitable direction of the abutment 6 develops a radial reaction such as $R_2$. This balances $R_1$ when the inclination is substantially equal to the angle $\alpha$, but, in some cases, a different, and in particular higher, value may be chosen.

It will be understood that, by way of a modification, the face may be other than planar, and/or the pin 8 may have a shape other than cylindrical. In any case, it is the tangent plane common to the point of contact between the face 7 and the pin 8 which has the inclination defined hereinbefore.

Having now described my invention what I claim as new and desire to secure by Letters Patent is:

1. A gear drive device comprising a support member, a drive pinion rotatably mounted on the support member, a driven toothed element movably mounted on the support member, a stop element mounted in a fixed position on the support member, an abutment in a fixed position on the toothed element and capable of abutting against the stop element at an end-of-travel position of the toothed element, the pinion and the toothed element respectively having teeth engaging each other so as to generate a driving force at a positive pressure angle relative to the tangent to the pitch circle of the pinion, and means for pressing the toothed element and the pinion against each other so as to generate an abutment force which is parallel and substantially opposed to said driving force when the abutment is cooperative with the stop element.

2. A device according to claim 1, wherein said means are capable of pressing the toothed element and the pinion against each other with a force proportional to a force exerted by the abutment against the stop element.

3. A device according to claim 2, wherein the teeth have flanks and the abutment has an active face which is cooperative with the stop element, the active face being inclined relative to a direction perpendicular to said tangent in the same direction as drivingly engaged flanks of the teeth.

4. A device according to claim 3, wherein said perpendicular direction is a radial direction relative to the toothed element and the inclination of the active face of the abutment relative to said radial direction is at least equal to the inclination of said flanks relative to said radial direction.

5. A device according to claim 4, wherein the active face of the abutment is perpendicular to the direction of the force transmitted through the meshed teeth.

6. A device according to claim 3, 4 or 5, wherein the active face of the abutment is planar and is cooperative with a cylindrical surface of the stop element.

7. A window winder, in particular for an automobile vehicle, said winder including a drive device which comprises a support device, a drive pinion rotatably mounted on the support device, a driven toothed sector rotatably mounted on the support member, a stop element mounted in a fixed position on the support member, an abutment in a fixed position on the toothed sector and capable of abutting against the stop element at an end-of-travel position of the toothed sector, the pinion and the toothed sector respectively having teeth engaging each other so as generate a driving force at a positive pressure angle relative to the tangent to the pitch circle of the pinion, and means for pressing the toothed sector and the pinion against each other so as to generate an abutment force which is parallel and substantially opposed to said driving force when the abutment is cooperative with the stop element.

* * * * *